June 11, 1963 H. F. JOHN ET AL 3,093,520

SEMICONDUCTOR DENDRITIC CRYSTALS

Filed March 11, 1960 3 Sheets-Sheet 1

INVENTORS
Harold F. John &
John W. Faust, Jr
BY
Frederick Shapoe
ATTORNEY

June 11, 1963 H. F. JOHN ET AL 3,093,520

SEMICONDUCTOR DENDRITIC CRYSTALS

Filed March 11, 1960 3 Sheets-Sheet 3

United States Patent Office 3,093,520
Patented June 11, 1963

3,093,520

SEMICONDUCTOR DENDRITIC CRYSTALS

Harold F. John, Wilkinsburg, and John W. Faust, Jr., Forest Hills, Pa., assignors to Westinghouse Electric Corporation, East Pittsburgh, Pa., a corporation of Pennsylvania Filed Mar. 11, 1960, Ser. No. 14,396
6 Claims. (Cl. 148—33)

This invention relates to a process for producing doped dendrite crystals of solid semiconductor materials, and in particular to the growing of semiconductor dendrites with multiple doped zones therein.

At the present time, crystals of many solid materials are produced by preparing a melt of the solid material, contacting the surface of the melt with a previously prepared crystal of the material and slowly withdrawing the previously prepared crystal. Usually the rate of withdrawal is of the order of an inch an hour, to produce a desired grown crystal member. It has been the invariable practice in such a process in the past to maintain the melt, during crystal growing, at a temperature slightly above the melting point of the solid material.

The nature and configuration of the withdrawn crystals produced by such prior art practices have generally been uncontrollable except within relatively broad limits. Thus, the thickness has not been readily maintained within a precise dimension. In many cases, surface and internal imperfections such as dislocations and other crystal structure flaws have been present in the grown crystals.

In the semiconductor industry, crystals of silicon, germanium and compounds of the group III–group V elements of the periodic table have been grown from melts in accordance with this prior art practice. In order to employ such grown crystals in semiconductor devices, it has been necessary to saw them into slices using, for example, diamond saws. Thereafter, dice of the desired shape have been cut from these slices. The sawed surfaces of the dice are lapped or otherwise mechanically polished to remove disturbed or otherwise unsatisfactory surface layers, which treatment is followed by an etch to remove microscopic surface imperfections. As a result of this working, which is performed on expensive precise machinery and requires highly-skilled labor, there may be a loss of as much as 90% of the original grown crystals in securing dice that have satisfactory shape and configuration for semiconductor applications. In addition, the loss from processing of the dice is increased by errors and mistakes in the doping of the dice, by the alloy fusion method, the vapor diffusion method, or any other method known to those skilled in the art to form selected zones of p- or n-type semiconductivity.

The object of the present invention is to provide a dendritic crystal comprising at least three zones of two different types of semiconductivity wherein one zone comprises an H-shaped cross-section in which the legs of the H form the exterior surfaces and two other zones comprise the spaces between the legs and the cross bar of the H.

An object of the present invention is to provide a process for producing selectively doped dendritic crystals containing at least three regions of alternating semiconductivity which have a desired thickness from a supercooled melt comprised of a semiconductor material and at least one p-type and at least one n-type doping material, the segregation coefficients and concentration of which in the melt are correlated.

Another object of the present invention is to provide a process for producing flat selectively doped dendritic crystals of solid materials having therein at least two p-n junctions by preparing a melt of a semiconductor material and at least one p-type and at least one n-type doping material, the doping materials being present in the melt in suitable concentrations, supercooling the melt and thereafter withdrawing dendritic crystals containing doping impurities in the desired proportions in selected regions from the melt.

A still further object of the invention is to provide a method for preparing doped dice from semiconductor materials without mechanical cutting operations by preparing flat selectively doped dendritic crystals having at least two p-n junctions from a supercooled melt of a material and, then, scoring the flat surfaces and breaking the flat crystals along the score lines to produce the desired dice.

Another object of the invention is to provide a semiconductor device comprising a portion of a dendritic crystal which comprises at least three grown zones of two different types of conductivity and at least two contacts affixed to the different zones.

Other objects of the invention will, in part, be obvious and will, in part, appear hereinafter.

For a better understanding of the nature and objects of the invention, reference should be had to the following detailed description and drawing, in which.

Figure 1:
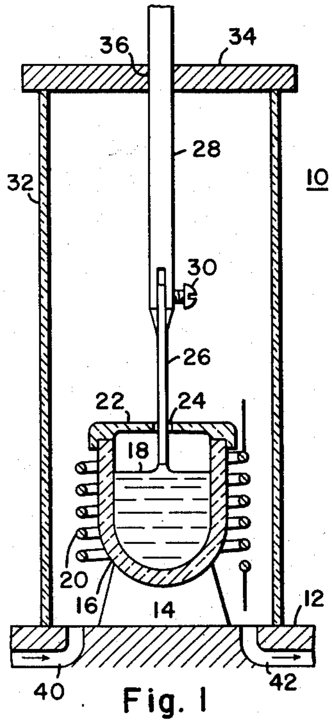
FIGURE 1 is a view in elevation partly in section of a crystal growing apparatus suitable for use in accordance with this invention.

In accordance with the present invention, it has been discovered that selectively doped crystals of solid materials having desired p-n junctions may be prepared as flat dendritic crystals having a closely controlled thickness and relatively precise flat parallel faces. These selectively doped flat dendritic crystals may be pulled or grown from doped melts of the material at a relatively high rate of speed of pulling of the order of 100 times and greater than the linear pulling velocity previously employed in the art. The thickness of the crystals and impurity carrier concentration may be readily controlled and surface imperfections minimized or reduced by following the teachings of the present invention.

More particularly, in practicing the process, a melt comprised of the material to be grown into a flat dendritic crystal and selected doping materials, is prepared at a temperature slightly above the melting temperature thereof. The surface of the melt is contacted with a previously prepared crystal having a plurality of twin planes for example 3 twin planes, at the interior thereof, the crystal being oriented in the <211> direction vertical to the melt surface and with the vertices of etch pits in the crystal surfaces being directed upwardly. Other necessary or desirable crystallographic and physical features of the seed crystal will be discussed in detail hereinafter.

The seed crystal is dipped into the surface of the melt a sufficient period of time to cause wetting of the lower surface of the seed, usually a period of time of a few seconds is adequate, and, then, the melt is supercooled rapidly, following which the seed crystal is withdrawn with respect to the melt at a speed of the order of from 1 to 20 inches a minute. Under some conditions, considerably slower pulling speeds than an inch per minute can be employed, for example, 0.2 inch per minute. Pulling speeds of from 4 to 8 inches per minute have given good results. The degree of supercooling and the rate of pulling of the seed crystal from the melt can be so correlated as to produce a thin strip of solidified melt material having a precise desired thickness and carrier concentration and having the desired crystallographic orientation.

The present invention is particularly applicable to solid materials crystallizing in the diamond cubic lattice structure. Examples of such materials are the elements silicon and germanium. Likewise, stoichiometric compounds having an average of four valence electrons per atom respond satisfactorily to the crystal growing process. Such compounds which may be processed with excellent results comprise substantially equal molar proportions of an element of group III of the periodic table, particularly aluminum, gallium and indium, combined with an element of group V, of the periodic table, particularly phosphorous, arsenic and antimony. Compounds comprising stoichiometric proportions of group II and group VI elements, for example, zinc, selenium and zinc sulphide, can be processed. These materials crystallizing in the diamond cubic lattice structure are particularly satisfactory for various semiconductor applications.

The dendrite of semiconductor material produced in accordance with the teachings of this invention comprises an elongated body having two substantially parallel flat faces of {111} orientation extending in the lengthwise direction. When cut transversely and etched, a suitable dendrite will exhibit two substantially symmetrical portions disposed about a plane perpendicular to the faces and extending midway of the edges along the lengthwise direction of the dendrite. Each symmetrical portion comprises two outer legs extending from the perpendicular plane and forming the flat faces of the dendrite and a central cross-bar connecting the legs at the plane, the legs and cross-bar being of one-type of semiconductivity, and at least one area between the legs extending laterally from the cross-bar to the outside edge which latter area is of the opposite type of semiconductivity.

For a better understanding of the practice of the invention, reference should be had to FIG. 1 of the drawing wherein there is illustrated apparatus 10 for practicing the process of this invention. The apparatus comprises a base 12 carrying a support 14 for a crucible 16 of a suitable refractory metal, such as graphite, to hold a melt 18 comprised of a material from which the flat dendritic crystals are to be drawn and suitable p and n-type doping materials in predetermined proportions. The melt 18, which comprises a semiconductor material, for example, germanium, and an n-type doping material, for example, antimony, and a p-type doping material, for example, boron, both doping materials being present in selected proportions, is maintained within the crucible 16 in the molten state by a suitable heating means, for example, an induction heating coil 20 disposed about the crucible. Controls, not shown, are employed to supply an alternating electrical current to the induction coil 20 to maintain a closely controllable temperature in the body of the melt 18. The temperature should be readily controllable to provide a temperature in the melt a few degrees above the melting point and also to reduce heat input so that the temperature drops in a few seconds, for example in 5 to 15 seconds, to a temperature at least one degree below the melting temperature and preferably to supercool the melt from 5° to 15° C., or lower. A cover 22 closely fitting the top of the crucible 16 may be provided in order to maintain a low thermal gradient above the top of the melt. Passing through an aperture 24 in the cover 22 is a seed crystal 26 having a plurality of twin planes, preferably three, and oriented crystallographically as will be disclosed in detail hereinafter. The crystal 26 is fastened to a pulling rod 28 by means of a screw 30 or the like. The pulling rod 28 is actuated by suitable mechanism to control its upward movement at a desired uniform rate, ordinarily in excess of one inch per minute. A protective enclosure 32 of glass or other suitable material is disposed about the crucible with a cover 34 closing the top thereof except for an aperture 36 through which the pulling rod 28 passes.

Within the interior of enclosure 32 is provided a suitable protective atmosphere entering through a conduit 40 and, if necessary, a vent 42 may be provided for circulating a current of such protective atmosphere. Depending on the crystal material being processed in the apparatus, the protective atmosphere may comprise a noble gas such as for example helium or argon, or a reducing gas such as hydrogen or mixtures of hydrogen and nitrogen, or nitrogen or the like or mixtures of two or more gases. In some cases, the space around the crucible may be evacuated to a high vacuum in order to produce crystals of materials free from any gases.

In the event that the process is applied to compounds having one component with a high vapor pressure at the temperature of the melt, a separately heated vessel containing that component may be disposed in the enclosure 32 to maintain therein a vapor of such component at a partial pressure sufficient to prevent impoverishing the melt or the growing crystal with respect to that component. Thus, an atmosphere of arsenic may be provided when suitably doped crystals of gallium-arsenide are being pulled. The enclosures 32 may be suitably heated, for example, by an electrically heated cover to maintain the walls thereof at a temperature above the temperature of the separately heated vessel containing the arsenic in order to prevent condensation of arsenic thereon.

Figure 2:
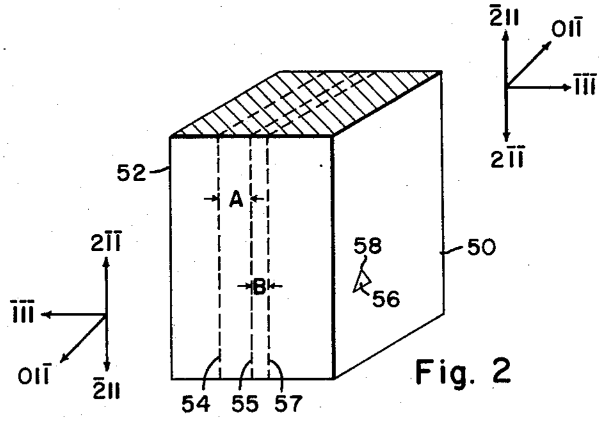
FIG. 2 is a greatly enlarged fragmentary view, in cross-section of a dendritic seed crystal.

Referring to FIG. 2 of the drawing, there is illustrated, in greatly enlarged view, a section of a preferred seed crystal 26 having three twin planes. Seed crystals may be obtained in various ways, for example, by supercooling a melt of the solid material to a temperature at which a portion thereof solidifies, at which time some dendritic crystals having a plurality of internal twin planes will be formed and may be removed from the melt. While these crystals may not be uniform, they are suitable for seed purposes. Also, one can cut from a crystal a section suitable for use as a seed crystal.

The seed crystal 26 comprises two relatively flat parallel faces 50 and 52 with intermediate interior twin planes 54, 55 and 57. The faces 50 and 52 have the crystal orientation indicated by the crystallographic direction arrows at the right and left faces respectively of the figure. It will be noted that the horizontal direction perpendicular to the flat faces 50 and 52 and parallel to the melt surfaces is <111>. The direction of growth of the dendritic crystal will be in a <211> crystallographic direction. If the faces 50 and 52 of the dendritic crystal 26 were to be etched preferentially to the {111} planes, they will both exhibit equilateral triangle etch pits 56 whose vertices 58 will be pointed upwardly while their bases will be parallel to the surface of the melt. It is an important feature of the preferred embodiment of the present invention that the etch pits of both faces 50 and 52 of seed crystals 26 have their vertices 58 pointed upwardly. The spacings or lamellae between the successive adjacent twin planes ordinarily are not uniform. The lamellar spacing, such as "A" between twin planes 54 and 55, and "B" between twin planes 55 and 57, is of the order of microns, that is from a fraction of a micron to 15 to 20 microns or possibly greater. The ratio of A to B as determined from studies of numerous dendritic crystals has varied in the ratio of slightly more than 1 to as much as 18. Good seed crystals have been found to have lamellar spaces between successive twins of 5 microns and 1⅔ microns, respectively. In all cases all the twin planes in good seed crystals extend entirely through the seed. Where the twin planes terminate internally the seed crystal behaves as if no such twin plane is present insofar as pulling dendrites therewith from a melt.

It has been further discovered that, due to the microscopically small lamellar distances between twin planes, it is highly difficult to determine whether one or more than one twin plane is present in a dendrite or seed crystal. In a number of cases, using all apparent care, it has appeared that but a single twin plane was present in a given dendrite seed crystal. However, improved techniques have been developed which show clearly that these dendritic crystals contain three or even more closely spaced twin planes. One of these improved techniques comprises scribing a line transverse of the length of the dendrite, bending the dendrite at the scribed line to bow it away from the scribed line until it fractures thereat, and, without polishing or otherwise working on the fractured face, examining it under a microscope at a magnification of at least 100×, and preferably 200× to 500×. The fracturing results in relatively flat faces developing at successive lamellae at different angles to each other which stand out distinctly under illumination. Also, preferentially etching of a polished cross-section, preferably cross-sections lapped at an angle to the flat face, so as to selectively distinguish the lamellae from each other, will enable the separate twin planes to be clearly distinguished.

The most satisfactory crystal growth is obtained by employing seed crystals of the type exhibited in FIG. 2 wherein three twin planes are present interiorly and are continuous across the entire cross-section of the seed.

Seed crystals having an odd number (other than 1 and 3, that is 5, 7 and up to 13 or more) of twin planes containing the growth direction may be employed in practicing the process of this invention, due care being had to point the triangular etch pits on the outer faces of the crystal with their vertices upwardly and the bases parallel to the surface of the melt. Further, seed crystals containing an even number of twin planes may be employed for crystal pulling, though as desirable pulled crystals will not be obtainable as with the preferred three twin plane seed crystal as shown in FIG. 2. Normally, the pulled dendrite will exhibit the same twin plane structure as the seed crystal exhibits. Thus, the dendrite will have three twin planes extending through its entire length, and often extending from edge to edge, if the seed comprises three twin planes.

The direction of withdrawal of the seed crystal 26 having an odd number of twin planes from the melt 18 must be with the direction of the vertices 58 of the etch pits being upward and the bases being substantially parallel to the surface of the melt. When so withdrawn, the melt will solidify at the bottom of the crystal in a satisfactory prolongation thereof. If the crystal 26 were to be inserted into the melt so that the vertices 58 pointed downwardly, very erratic grown crystals will be produced which are not only of non-uniform dimensions but grow at angles of 120° to the seed and produce very irregular spines, and generally are unsatisfactory.

When a relatively cold flat seed crystal has been introduced into the melt which is at a temperature of only a few degrees above the melting point of the material, the melt will dissolve the tip of the seed crystal. However, there will be a meniscus-like contact between the seed crystal and the body of the melt. Such contact should be maintained by keeping the temperature of the melt close to the melting point of the material.

Upon reducing the power input to the heating coil in order to supercool the melt (or reducing the applied heat if other modes of heat application than inductive heating are employed) there will be observed in a period of time of the order of 5 seconds after the heat input is reduced to a crucible of about 2 inches in diameter and length of 2 inches, the supercooling being about 8° C., an initial elongated hexagonal growth or enlargement on the surface of the melt at the tip of the seed crystal. The hexagonal surface growth increases in area so that in approximately 10 seconds after heat input is reduced its area is approximately 3 times that of the cross section of the seed crystal. At this stage, there will be evident spikes growing out of the two opposite hexagonal vertices lying in the plane of the seed. These spikes appear to grow at the rate of approximately two millimeters per second. When the spikes are from two to three millimeters in length the seed crystal pulling mechanism is energized to pull the crystal from the melt at the desired rates. The initiation of pulling is timed to the appearance and growth of the spikes for best results.

After pulling the seed crystal upwardly from the supercooled melt, it will be observed that the flat solid diamond shaped area portion is attached to the seed crystal and that a downwardly extending dendritic crystal has formed at each end of the elongated diamond area adjacent the spike. Accordingly, two dendritic crystals can be readily pulled from the melt at one time from a single seed crystal. By continued pulling the two dendritic crystals may be extended to any desired length.

If the seed crystal is disposed so that one edge is nearer the thermal center of the melt crucible than is the other edge, it is possible to increase briefly either the pulling rate or the temperature of the melt, and under these variations the dendritic crystal furthest away from the thermal center or in a hotter region will usually stop growing and thereafter only a single dendritic crystal will be attached to and grow from the seed. Also, if the double dendritic crystal attached to the original seed crystal is introduced into the same or another melt slightly above the melting temperature and after supercooling the melt, on pulling the double dendritic crystal from the surface, there will be formed two diamond shaped areas attached to the double dendrites and four dendritic crystals will be pulled—two attached to each of the original dendrites. Thus, in one instance four germanium dendrites each 5 inches in length were pulled from the melt. While more than 4 dendritic crystals can be pulled from a melt, there may arise interference and other factors which will render such growth difficult.

If the seed crystal 26 were to be pulled at a slowly increasing rate just as supercooling of the crucible is being effected by reducing the heat input, so that at the end of about 5 to 10 seconds the full pulling rate is being applied, then only one dendritic crystal will usually be attached to the seed crystal.

The seed crystal need not be flat. It may be of any suitable size or shape as long as its orientation corresponds to that shown in FIG. 2. Usually a portion of a previously grown dendritic crystal having a plurality of twin planes will be quite satisfactory for use as a seed and ordinarily such will be used as the seed crystal. The pulled dendritic crystal need have no direct relation to the seed crystal as far as size is concerned. The pulled dendritic crystal will have a size and shape depending on the pulling conditions.

In growing satisfactory flat faced dendritic crystals in accordance with the present invention, the melts of the materials may be supercooled as much as 30 to 40° C. below their melting point. In practice, however, supercooling of from 5 to 15° C. has given best results with germanium and indium antimonide, for example. A greater degree of supercooling requires higher rates of crystal withdrawal from the melt as well as requiring more precise control of the speed of pulling. Germanium and indium antimonide dendritic crystals have been satisfactorily pulled at rates of from 4 inches to 12 inches per minute from melts supercooled 5° C. to 15° C. As an example, these crystals have had a highly uniform thickness selected from the range of from 3 to 20 mils and a selected width of from 1 to 4 millimeters. The length of these crystals is limited solely by the pulling apparatus employed. No difficulty has been experienced in pulling crystals of, for example, 7 inches in length in a slightly modified crystal pulling furnace as normally used in the art.

Figure 3:
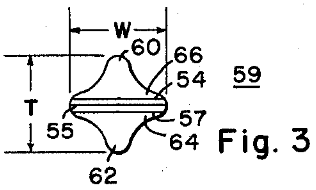
FIGS. 3 through 11 are end views, in cross-section in various stages of growth.

The growth process of the dendrite itself can, for purposes of discussion, be considered as taking place in four steps. However, it should be realized that these four steps blend almost indistinguishably, one into the other and actually occur with great rapidity. The first step is the formation of a core or central region 59 as illustrated in FIG. 3, wherein the seed 26 is viewed in cross-section a short distance behind the tip. It can be seen that the core or central region 59 containing the twin planes 54, 55 and 57 is propagated rapidly ahead of other growth and assumes a cruciform structure, with well defined growth regions 60 and 62 perpendicular to the twin planes 54, 55 and 57. In this early stage of growth, the rate of growth of regions 60 and 62, which are perpendicular to the twin planes, may be far greater than the rate of growth of the regions 64 and 66 which are parallel to the twin planes. The regions 60 and 62 determine the thickness T of the final dendrite and the regions 64 and 66 determine, to a limited extent the width of the final dendrite. During this first step the cruciform structure, which forms the core of the ultimate dendrite, may reach an appreciable fraction of the final thickness of the dendrite while achieving only a small fraction of the final width of the dendrite.

Figure 4:
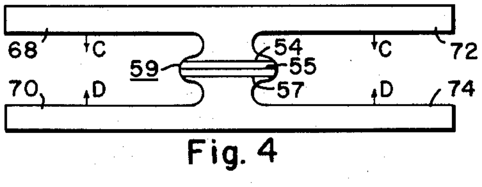
Figure 5:
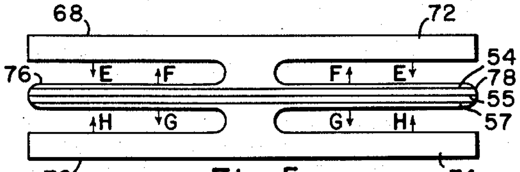

When the growth of regions 60 and 62 perpendicular to the twin planes has progressed to the degree that T is a substantial proportion of the final thickness of the dendrite, well defined growth facets form along the outer edges of the regions 60 and 62 as shown in FIG. 4. These facets are designated as 68, 70, 72 and 74 respectively in FIG. 4. The dendrite now has an H shape cross-sectional configuration with the facets 68, 70, 72 and 74 forming the legs of the H and the core 59 forming the cross-bar of the H. The lateral growth of the facets 68, 70, 72 and 74 proceeds rapidly outwardly from the core 59 and is independent of the growth of the core 59. Under some circumstances, which will be discussed hereinafter, the central region containing the twins may grow outwardly faster than the outside arms with the resuult that a double E, or back to back E, structure results such as is illustrated in FIG. 5. The central legs 76 and 78 may grow to substantially the same length as the legs 68, 70, 72 and 74 or they may extend beyond as do legs 176 and 178 in FIG. 6, or in many cases the central legs may be shorter than the legs 68, 70, 72 and 74 and may comprise only a light protuberance from the cross-bar or core 59.

Figure 7:
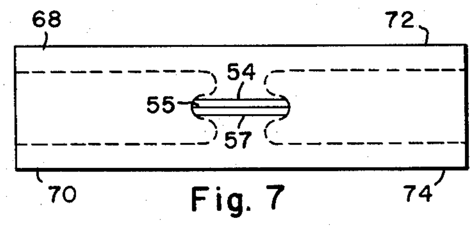
Figure 8:
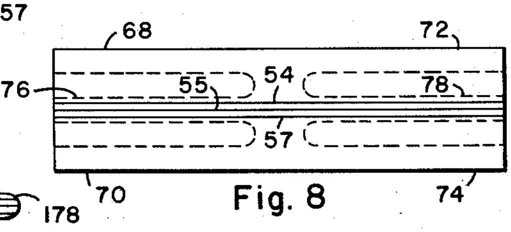

Referring again to FIGS. 3 and 4, during the growth of the legs or facets, step three takes place during which the area between the legs is filled in by material solidifying inwardly from the legs. The growth directions are designated by the arrows C and D in FIG. 4 and E, F, G and H in FIG. 5. The resultant fully grown dentrites are illustrated in FIGS. 7 and 8. FIG. 7 shows one dendrite cross-section in which the area between the legs 68, 70, 72 and 74 of FIG. 4 is filled in with solidified material and FIG. 8 shows the areas between the legs 68, 70, 72, 74, 76 and 78 of FIG. 5 filled in with solidified material.

The final step, which is the addition of layers of submicroscopic thickness to the exterior surfaces of the legs, gives the dendrite its practically atomically flat mirror-like surface, then takes place, just as the dendrite is pulled from the melt.

The dendritic growth process described immediately above lends itself readily to the production of dendrites having alternate layers of opposite types of semiconductivity if the doping materials are selected on the basis of their segregation coefficients, that is, the ratio of amount in the solid phase to that in liquid phase, and their respective concentrations in the melt are controlled. The presently accepted equilibrium segregation coefficients in germanium of the most common p- and n-type doping materials are set forth below in tabular form:

TABLE

| Element | Segregation Coefficient in Germanium |
|---|---|
| (P-type): | |
| Boron | 17 |
| Aluminum | .10 |
| Gallium | .10 |
| Indium | .001 |
| Thallium | .00004 |
| (N-type): | |
| Phosphorus | .12 |
| Arsenic | .04 |
| Antimony | .003 |
| Bismuth | .00004 |

These segregation coefficients are valid only at the melting point of germanium and under conditions of normal equilibrium solidification. It has been found that the segregation coefficient usually will be vastly different in dendrite growth. However, as a first approximation for selecting pairs of doping materials for producing alternate layers of opposite types of semiconductivity in dentdrites, it can be assumed that the relative order, will be the same for dendritic growth as for conventional crystal growth (about 0.001 inch per second).

Figure 9:
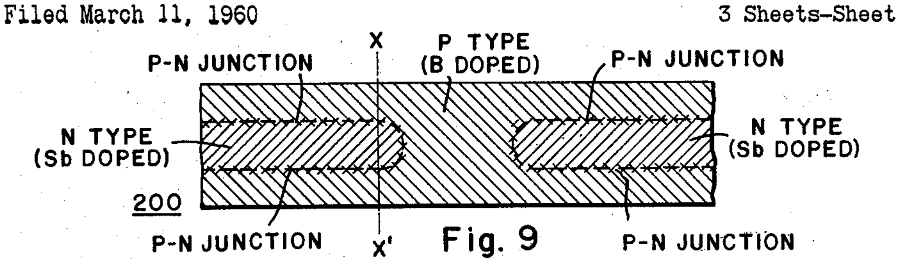
Figure 10:
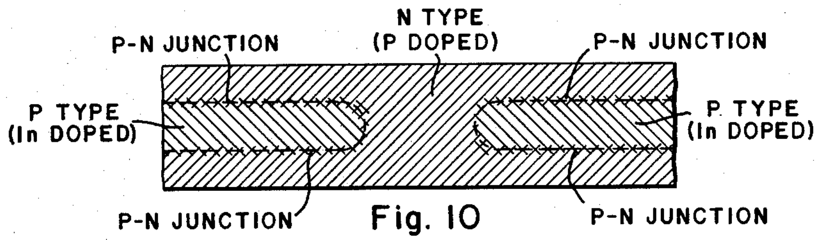

The process for achieving three or five zone dendrites from the melt requires doping with at least two impurities, an n-type and a p-type, one of which segregates more readily than the other. The impurity which does not tend to segregate in the liquid phase as readily as the other impurity, will come down predominately in the core and outwardly growing legs. The impurity which is segregated most easily in the liquid phase will concentrate in the liquid melt, be the last to solidify and consequently will solidify in the areas between the legs. From the table, it can be seen that doping with boron, as the p-type impurity and antimony, as the n-type impurity in roughly equal atomic amounts, gives a good combination of doping impurities. The antimony is segregated in the liquid phase much more readily than the boron. The resultant structure would have a p-type core and legs and an n-type area between the legs. Such a structure is illustrated in FIG. 9. To obtain the reverse conductivity configuration, a good combination is indium as the p-type impurity, and phosphorus as the n-type impurity. Indium segregates more readily in the liquid phase than does phosphorus, thus with proper adjustment in concentrations, the core and legs regions will be doped n-type by a predominance of phosphorus, and the areas between the legs will be doped p-type by a predominance of the indium. Such a structure is illustrated in FIG. 10.

The concentration of the respective doping materials in the melt, which should be at least $10^{13}$ atoms/cc. of melt and will usually range from $10^{13}$ to $10^{20}$ atoms/cc., must be determined independently for each system and in addition to being dependent on the respective materials involved is dependent to a degree on the degree of supercooling of the melt and the pull rate of the dendrite. Generally the doping materials are added in substantially equal amounts and then altered if necessary to produce a dendrite of desired carrier concentration and dendrite configuration. For example, to pull a three zone PNP dendrite of the type illustrated in FIG. 9 from a germanium melt supercooled 10° C., at a pull rate of 7 inches per minute, the melt was doped to a concentration of $5.86 \times 10^{14}$ atoms/cc. of boron and $5.56 + 10^{14}$ atoms/cc. of antimony per 100 grams of germanium. To pull a three zone NPN dendrite of the type illustrated in FIG. 10 from a germanium melt supercooled 8.5° C., at a pull rate of 6 inches per minute, the melt was doped to a concentration of $1.07 \times 10^{16}$ atoms/cc. of phosphorus and $2.11 \times 10^{17}$ atoms/cc. of indium.

Figure 6:
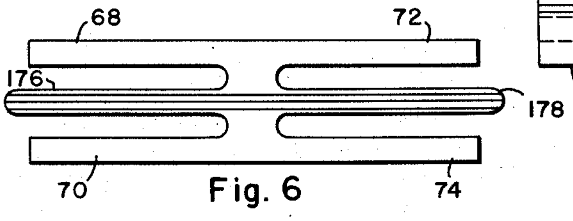
Figure 11:
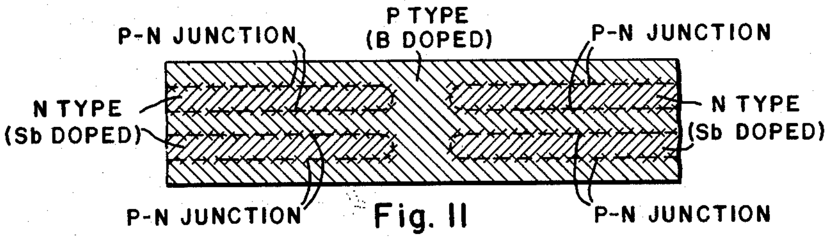

When the concentration of doping material in the melt is relatively high (especially that of the material with the larger segregation coefficient to predominate in the core and legs) and the pull rate is low, for example 2 to 4 inches per minute, the dendrite has a tendency to begin to grow in the double E configuration illustrated in FIGS. 5 or 6 and the complete dendrite is of the type illustrated in FIG. 11. If the dendrite of FIG. 11 was grown from a melt doped with boron and antimony it will have the five region configuration shown in FIG. 11.

In addition to the actual doping materials certain relatively neutral metals, for example tin, may be added to the melt to aid the doping materials to go into solution with the germanium or other semiconductor material.

Figure 12:
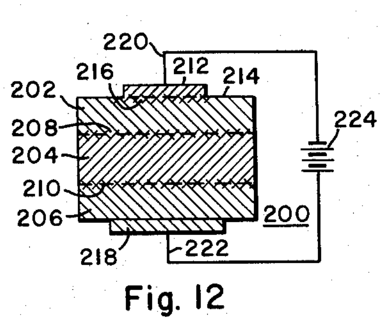
FIGS. 12 through 14 are side views, in cross-section of semiconductor devices prepared from dendrites prepared in accordance with the teachings of this invention.

The three and five zone dendrites grown in accordance with the teachings of this invention can be readily fabricated into semiconductor devices. For example, if a section of the dendrite of FIG. 9 was cut, etched or otherwise broken along the line XX', the section 200 would be comprised of three zones of alternate semiconductivity (PNP). With reference to FIG. 12 there is illustrated a device fabricated from the section 200 of FIG. 9. The section 200 of the dendrite is comprised of a first p-type region 202, a first n-type region 204 and a second p-type region 206. There is a p-n junction 208 between regions 202 and 204 and a p-n junction 210 between regions 204 and 206. A second n-type region 212 is then formed on the surface 214 of the dendrite section 200, by alloying vapor diffusion or the like using an n-type doping impurity, and a p-n junction 216 is formed between the region 212 and the region 202. An ohmic contact 218 is then fused to surface 220 of region 206. Contacts 220 and 222 are then affixed to the region 212 and ohmic contact 218 and the structure biased across a direct current power source 224. The resulting structure is a npnp two terminal switching device.

Figure 13:
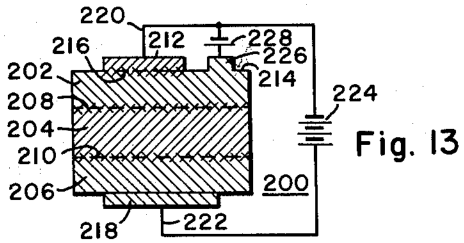

With reference to FIG. 13, the structure of FIG. 12 is modified by affixing a gate electrode 226 to surface 214 of region 202, and connecting the gate 226 in series with a power source 228 and region 212, the resulting structure would be a three terminal npnp switching device.

Figures 14, 15:
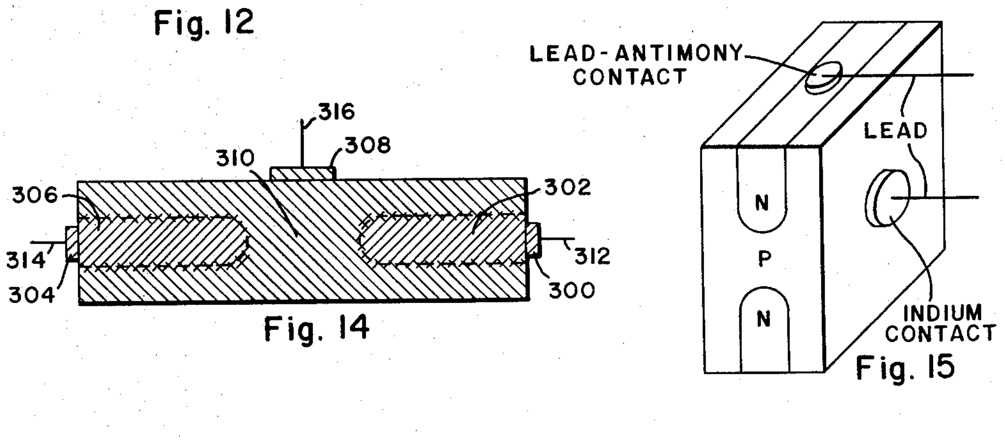
FIG. 15 is a view in perspective, and partly in cross-section, of a semiconductor device prepared from a dendrite prepared in accordance with the teachings of this invention.

With reference to FIG. 14 a transistor can be readily fabricated from a section of the dendrite of FIG. 9 by affixing an emitter contact 300 to n-region 302, a collector contact 304 to n-region 306 and a base contact 308 to p-region 310. Electrical leads 312, 314 and 316 are attached to contacts 300, 304 and 308 respectively to facilitate making connections to other electrical apparatus (not shown).

With proper pulling and supercooling conditions, a dendrite seed crystal containing two and more groups of twin planes, each group being comprised of at least two twin planes, which groups are spaced a substantial distance apart as compared to the spaces betwen the twin planes in each group, for example 1 to 2 mils, can be employed in the growing of a dendrite which has at least one leg portion projecting from a central core of the dendrite for each group of twin planes. Thus, by a process similar to the process resulting in the double E-type 5-region dendrites, it is possible to produce dendrites across whose transverse cross-sections there are 7-regions, and even more depending upon the number of groups of twin planes in the starting seed.

The following examples are illustrative of the teachings of this invention.

*Example I*

In apparatus similar to that illustrated in FIG. 1, a melt containing a quantity of germanium and $9.88\times10^{16}$ atoms/cc. of tin, $5.86\times10^{14}$ atoms/cc. of boron and $5.56\times10^{14}$ atoms/cc. of antimony per 100 grams of germanium was prepared in a graphite crucible. The tin was added in the form of 0.1 gram of a tin-germanium alloy comprised of 0.36% tin by weight. The boron was added in the form of 0.5 mg. of a boron-germanium alloy containing $3.89\times10^{-2}$ percent boron by weight. The antimony was added in the form of 1.3 mg. of an antimony-germanium alloy containing 0.16% by weight antimony. The melt was heated by the induction coil to a temperature several degrees above the melting point of the melt. A dendritic seed crystal having three twin planes and oriented as illustrated in FIG. 2 of the drawings is held vertically in a holder until its lower end touches the surface of the melt. The contact between the melt and the seed is maintained until a small portion of the end of the dendritic seed crystal has melted. Thereafter, the temperature of the melt is lowered rapidly in a matter of five seconds, by reducing current to the coil 20, to a temperature 10° C. below the melting point of the melt so that the melt is supercooled. After an interval of approximately 10 seconds at this temperature, the germanium seed crystal is pulled upwardly at a rate of 7 inches per minute.

The dendrite thus grown had the same PNP cross-section as that illustrated in FIG. 9.

*Example II*

A one-half inch section was cut from the dendrite of Example I.

An indium dot contact was alloyed onto the outer p-region of the three zone dendrite to form an ohmic contact therewith. A pellet comprised of 90%, by weight, lead and 10%, by weight, antimony was simultaneously alloyed to the end of the central n-type region. The alloying of both contacts was carried out a temperature of 575° C. Lead wires were then attached to the two ohmic contacts. The resulting structure is illustrated in FIG. 15.

Figure 16:
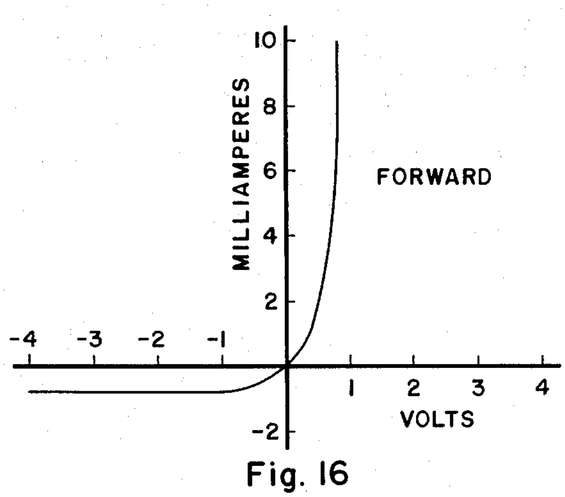
FIGS. 16 through 18 are graphs of the I–V characteristics of semiconductor devices prepared from dendrites prepared in accordance with the teachings of this invention.

The I–V characteristics of the device of this Example II thus prepared was determined. Rectification was observed as shown by the curve in FIG. 16 plotted from these tests.

*Example III*

Another section was cut from the PNP dendrite of Example I. The section was cut in such a way that the p-type central core region no longer connected the two outer p-type legs (cut for example along the line XX' of FIG. 9). The cutting provided a dendrite having two p-type regions separated by an n-type region.

A pellet comprised of 90%, by weight, lead and 10%, by weight, antimony was alloyed onto one of the p-type regions at a temperature of 575° C. to produce a thin n-type layer of regrown germanium on the top of the p-type region with a p-n junction between the p- and n-type regions. At the same time an ohmic contact of indium was alloyed to the other p-type layer. The resulting structure was a 4 region npnp structure with 3 p-n junctions. Of the 4 regions, three (pnp) were in the original dendrite. The resultant structure is essentially that illustrated in FIG. 12.

Figure 17:
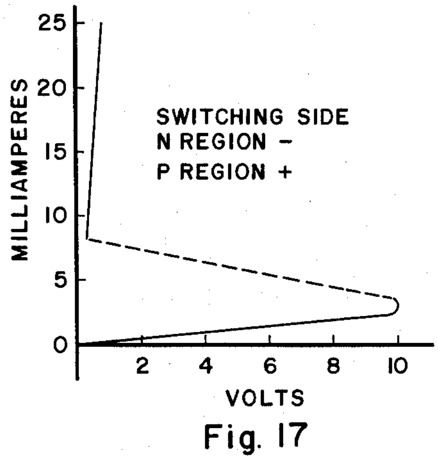

The I–V characteristics of this device of Example III were measured and the results are set forth in FIG. 17. A switching action was found when the n-type alloy formed region was biased negative and the p-type base was biased positive. When the polarities were reversed the device was able to withstand a PIV of greater than 100 volts.

*Example IV*

The switching device of Example III was modified by fusing an indium pellet to the same surface of the p-type region as the alloyed n-type region. The indium pellet served as a gate and was connected in series with a direct current power source and the n-type region formed by alloying, the gate being biased positive with respect to the n-type region. The resultant structure is essentially that illustrated in FIG. 13.

Figure 18:
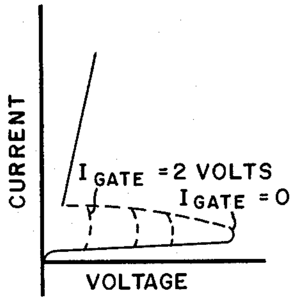

The I–V characteristics of this device of Example IV were determined and the results are set forth in FIG. 18. A switching action was found when the alloy formed n-type region was biased negative relative to the p-type base region. It was possible to vary the switching point by varying the gate current as is illustrated by the several dotted curves in FIG. 18.

*Example V*

Following the procedure of Example I, an npn three region dendrite of the type illustrated in FIG. 10 was pulled from a suitably doped melt. The melt was doped with $1.07\times10^{16}$ atoms/cc. of phosphorus and $2.11\times10^{17}$ atoms/cc. of indium per 100 grams of germanium. The phosphorus was added in the form of 0.04 mg. of InP and the indium in the form of 0.72 mg. of In.

The dendrite was pulled at a rate of 6 inches per minute from a melt that had been supercooled 8.5° C.

*Example VI*

The dendrite pulling procedure of Example I was followed to provide a 5-region pnpnp dendrite.

The melt was comprised of germanium doped to a concentration of $9.41\times10^{15}$ atoms/cc. of boron and $9.35\times10^{15}$ atoms/cc. of antimony per 100 grams of germanium. The boron was added to the melt in the form of 7.95 mg. of a boron-germanium alloy containing $3.89\times10^{-2}$ weight percent boron. The antimony was added in the form of 21.67 mg. of an antimony-germanium alloy containing 0.16 weight percent antimony.

Figure 19:
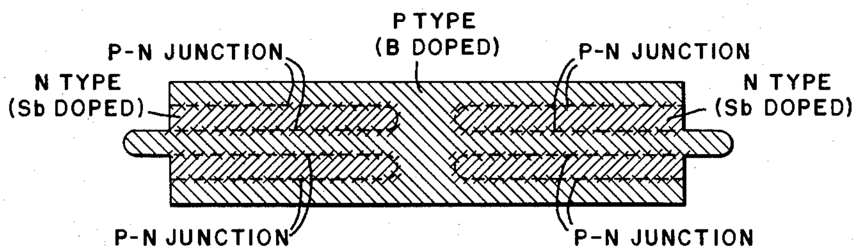
FIG. 19 is a side view in cross-section of a dendrite prepared in accordance with the teachings of this invention.

The dendrite was pulled at a rate of 2.1 inches per minute from a melt supercooled 5° C. The resultant structure is that illustrated in FIG. 19. The portion of the central p-region extending beyond the extremity of the dendrite may be removed as by etching or contacts may be affixed thereto by soldering.

Generally, the three and five region suitably doped dendritic crystals prepared in accordance with the teaching of this invention will have a thickness of the order of from 1 to 25 mils and the width across the flat face may be from 20 mils to 200 mils and even wider. The surface of the flat faces will exhibit essentially perfect (111) orientation. Properly grown crystals will have faces that are parallel and planar within a wave length of sodium light, per centimeter of length.

While the dendritic crystals may exhibit some degree of edge serration, dendritic crystals have been obtained with usably uniform edges having a minimum of ragged appearance. The serrated edges comprise only a small portion of the crystals and can be readily removed or left intact in dice since they do not affect the properties of essential or main body portion of the dendrites.

It has been discovered that when the doped dendritic crystals are grown under conditions where relatively cool gases come in contact with the dendritic crystal soon after it emerges from the melt, they will cool the grown doped crystal so as to produce large temperature gradients while the crystal is in a plastic state and a region of dislocations in the form of a narrow band along the center of the wide flat face may appear. The values of harmful temperature gradients will be dependent in part on the cross sectional area of the pulled crystal. However, temperature gradients of 100° C. per centimeter and less are low enough for most doped crystals to be free from imperfections. It has been determined that this surface imperfection is due primarily to a high temperature gradient in the solid material just above the melt which causes physical strains which affect the crystal perfection of the plastic crystal. Such imperfections or dislocations may be minimized or completely eliminated by providing means for decreasing the temperature gradient in a newly grown dendritic crystal for a short distance above the surface of the melt, for example, a distance of the order of 1 centimeter to 3 centimeters. Once the temperature of the doped crystals, for example, doped germanium crystals, has fallen to 700° C. there is no difficulty due to temperature gradients.

One means for producing such low temperature gradients is the application of the ceramic cup such as 22 to the top of the crucible whereby the heat of the melt is prevented from escaping and is radiated back for an appreciable distance above the surface of the melt. Thus, the radiant heat below the cover 22 in FIG. 1 prohibits the dendritic crystal 26 from cooling too rapidly or unevenly for an appreciable distance above melt 18 until the growing doped dendrite has cooled below the range of plasticity without introducing dislocations in other structure and imperfections. If desired, an external heating coil or sleeve may be disposed about the lower end of the dendrite crystal and an electrically conductive cap such as graphite applied about the crystal above the melt to be energized by high frequency current to produce a more controllable temperature gradient reducing effect.

By control of the temperature gradient at and near the melt surface, doped twinned single dendritic crystals can be grown from germanium and other materials which doped crystals will have surfaces of microscopic smoothness and crystallographic perfection. In some cases, only by interference pattern techniques can there be detected any change in the thickness of the surfaces. When examined, under the microscope and by interference pattern techniques usually the doped dendritic crystal faces will exhibit only flat steps, each of which is a perfect mirror flat crystal surface. In some cases, there will be only one or two steps per millimeter, the steps differing by 50 angstroms in height.

It has been discovered that the flat doped dendritic crystals of the present invention are relatively flexible, and crystals of a thickness of 7 mils may be bent on a radius on the order of 4 inches or even less without breaking. Consequently, crystals may be continuously drawn from the melt and wound on a cylinder of a radius of this order in continuous lengths, as desired. The thinner crystals obviously can be wound to a smaller radius than crystals of greater thickness.

While the invention has been described with reference to a particular embodiment and examples, it will be understood that modification, substitutions and the like may be made without departing from its scope.

We claim as our invention:

1. A dendrite of semiconductor material which exhibits areas of different types of semiconductivity in a transverse cross-section of the dendrite, comprising an elongated body having two substantially parallel flat faces of {111} orientation extending in the lengthwise direction, the dendrite having two substantially symmetrical portions disposed about a {110} plane perpendicular to the {111} faces and extending midway of the edges along the lengthwise direction of the dendrite, each symmetrical portion comprising, (1) at least two legs extending substantially perpendicularly from said {110} plane, the two outermost legs forming the flat faces of the dendrite, (2) a central cross-bar connecting the legs at the said plane, the legs and the cross-bar being of one type of semiconductivity, and (3) at least one area between the legs extending laterally from the cross-bar to the outside edge being of the opposite type of semiconductivity.

2. A dendrite of semiconductor material which exhibits areas of different types of semiconductivity in a transverse cross-section of the dendrite, comprising an elongated body having two substantially parallel flat faces of {111} orientation extending in the lengthwise direction, the dendrite having two substantially symmetrical portions disposed about a {110} plane perpendicular to the {111} faces and extending midway of the edges along the lengthwise direction of the dendrite, each symmetrical portion comprising (1) two outer legs extending from said {110} plane and forming the flat faces of the dendrite, (2) a central cross-bar connecting the legs at the said plane, the legs and the cross-bar being of one type of semiconductivity, and (3) an area between the legs extending laterally from the cross-bar to the outside edge, said area being of an opposite type of semiconductivity.

3. A dendrite of a semiconductor material which exhibits areas of different types of semiconductivity in a transverse cross-section of the dendrite, comprising an elongated body having two substantially parallel flat faces of {111} orientation, the dendrite having an H-shaped cross-sectional portion in which the legs of the H form the outside flat faced surfaces of the dendrite, said legs being perpendicular to the {110} of the dendrite, the legs and cross-bar of the H-shaped portion being of one type of semiconductivity, and two longitudinally extending areas between the legs on opposite sides of the cross-bar being of the opposite type of semiconductivity.

4. A dendrite of semiconductor material which exhibits areas of different types of semiconductivity in a transverse cross-section of the dendrite, comprising an elongated body having two substantially parallel flat faces of {111} orientation extending in the lengthwise direction, the dendrite having two substantially symmetrical portions about a {110} plane perpendicular to the {111} faces and extending midway of the edges along the lengthwise direction, each symmetrical portion having an E-shaped configuration of one type of semiconductivity, with the outside legs of the E forming the flat faces, and there being two areas between the legs of each E-shaped configuration of the opposite type of semiconductivity.

5. A dendrite of semiconductor material comprising an elongated body having two substantially parallel flat faces of {111} orientation extending in the lengthwise direction of the dendrite, the dendrite having two substantially symmetrical portions disposed about a {110} reference plane perpendicular to the {111} faces and extending substantially midway of the edges along the lengthwise direction of the dendrite, a central core being present around said {110} reference plane, said core having at least one group of twin planes perpendicular to said {110} reference plane disposed therethrough, each group of twin planes being comprised of at least two twin planes, each symmetrical portion of the dendrite disposed on opposite sides of the core being comprised of at least two legs for each group of twin planes, each leg being substantially perpendicular to said reference plane and extending from the core, and an area between successive legs, each of said areas extending from the core to the edge of the dendrite, said core and legs being of one-type of semiconductivity and the areas between the legs being of an opposite type of semiconductivity.

6. A dendrite of semiconductor material comprising an elongated body having two substantially parallel flat faces of {110} orientation extending in the lengthwise direction of the dendrite, the dendrite having two substantially symmetrical portions disposed about a reference plane perpendicular to the {111} faces and extending substantially midway of the edges along the lengthwise direction of the dendrite, a core of the dendrite being present around the reference plane, said core having at least one group of twin planes disposed therethrough in the <211> direction, each group of twin planes being comprised of at least two twin planes, and each group of twin planes being spaced from adjacent groups by at least 1 mil, each symmetrical portion of the dendrite disposed on opposite sides of the core being comprised of at least two legs extending from each group of twin planes, each leg being substantially perpendicular to the said reference plane and extending out from the core, and an area between adjacent legs, each of said areas etxending from the core to the edge of the dendrite, said core and legs being of one type of semiconductivity and the areas between the legs being of an opposite type of semiconductivity.

References Cited in the file of this patent

UNITED STATES PATENTS

| | | |
|---|---|---|
| 2,879,189 | Shockley | Mar. 24, 1959 |
| 2,928,761 | Gremmelmaier | Mar. 15, 1960 |
| 2,929,753 | Noyce | Mar. 22, 1960 |
| 2,935,478 | Bradshaw | May 3, 1960 |
| 2,937,114 | Shockley | May 17, 1960 |
| 2,954,307 | Shockley | Sept. 27, 1960 |

OTHER REFERENCES

Billig: "Growth of Monocrystals of Germanium From an Undercooled Melt," Proceedings of the Royal Society, A, vol. 229, pp. 346–363, 1955.

Billig et al.: Acta Cryst. (1955), vol. 8, pp. 353–354.

Bolling et al.: "Growth Twins in Germanium," Canadian Journal of Physics, vol. 34, 1956, p. 240.

Bennett and Longini: The Physical Review, vol. 116, No. 1, pp. 53–61, Oct. 1, 1959.

Canadian Journal of Physics, vol. 34, pp. 234–240, 1956.